E. C. HUTCHINSON AND E. W. ANDERSON.
SPIRAL CASING.
APPLICATION FILED OCT. 16, 1915.
1,380,065.
Patented May 31, 1921.
2 SHEETS—SHEET 1.
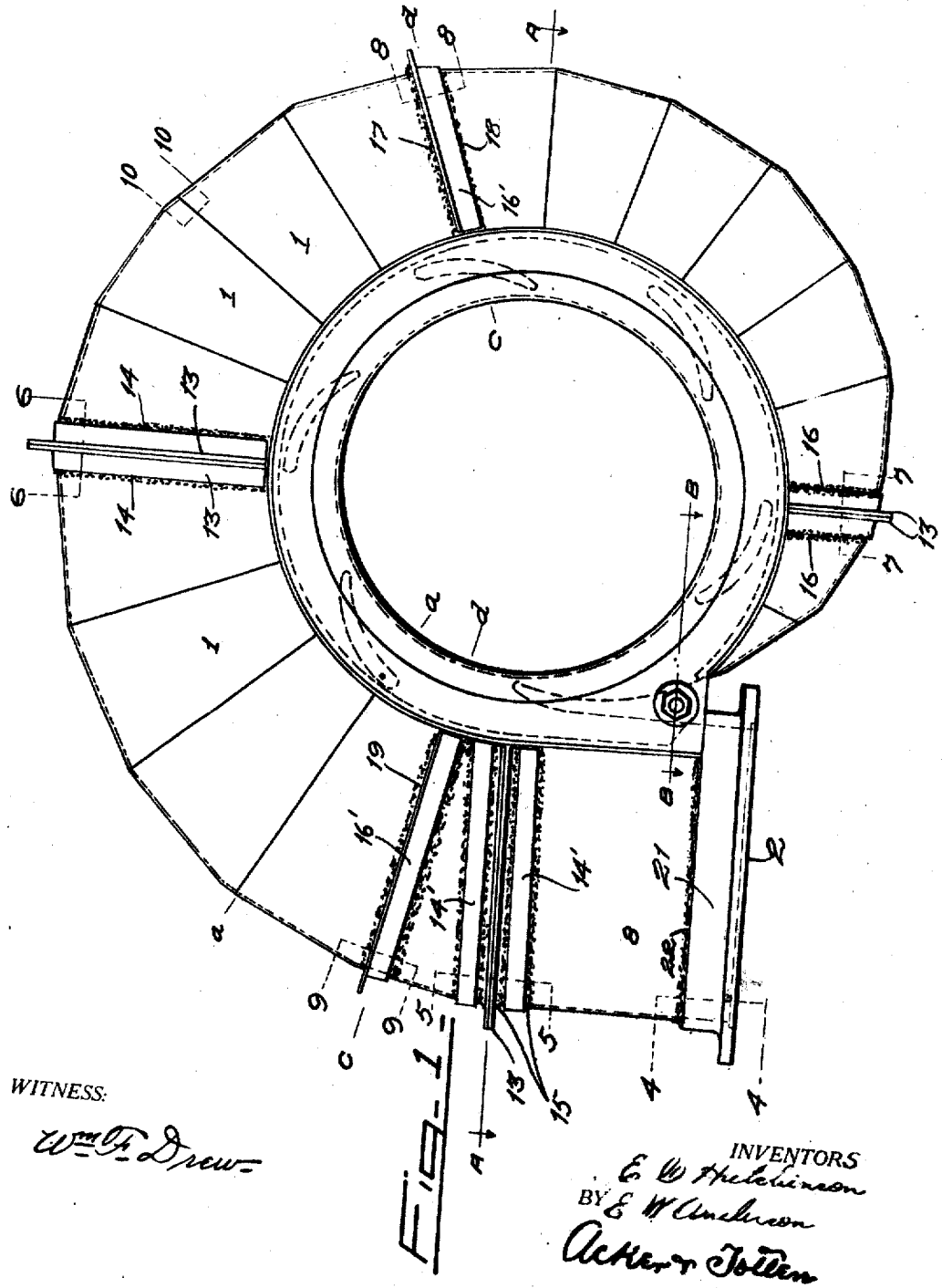
WITNESS:
Wm F. Drew
INVENTORS
E. C. Hutchinson
BY E. W. Anderson
Acker & Totten
ATTORNEYS.

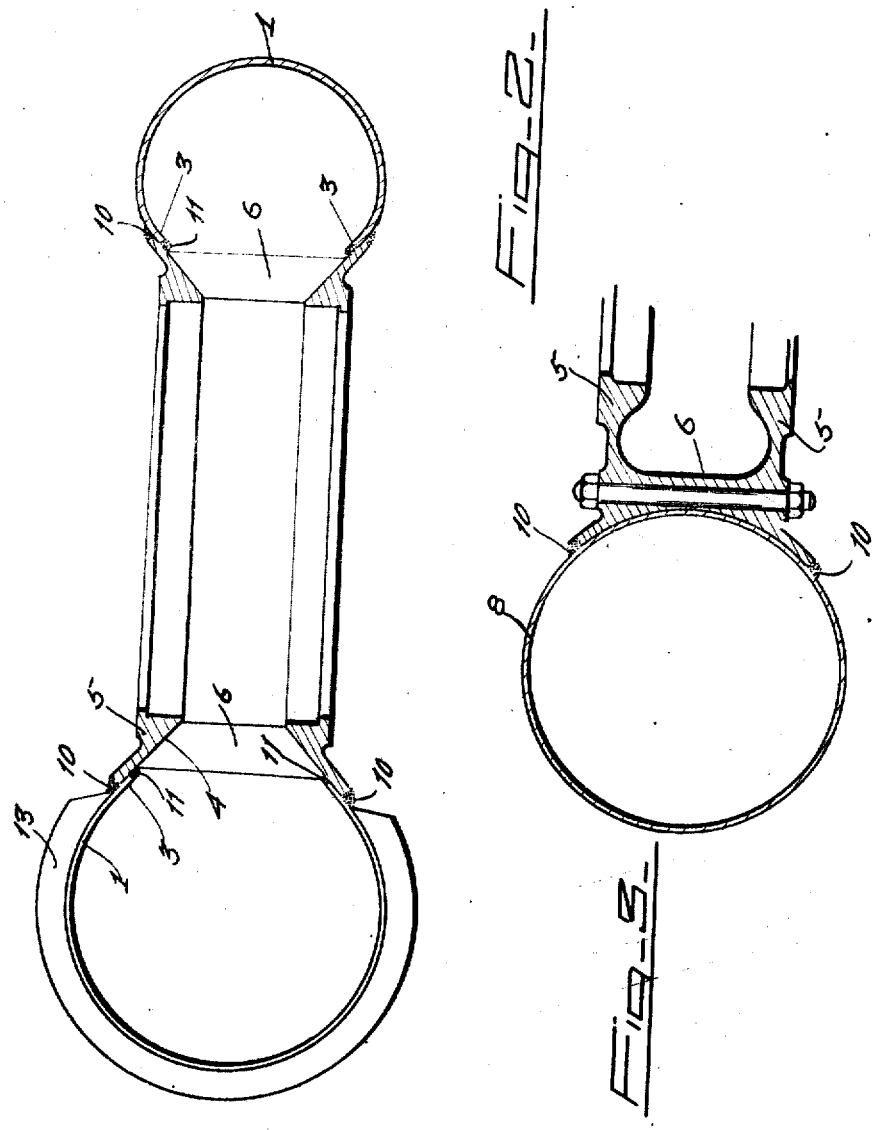

E. C. HUTCHINSON AND E. W. ANDERSON.
SPIRAL CASING.
APPLICATION FILED OCT. 16, 1918.

1,380,065.

Patented May 31, 1921.
3 SHEETS—SHEET 3.

WITNESS:
Wm F. Drew

INVENTORS
E C Hutchinson
BY E W Anderson
Acker & Totten
ATTORNEYS.

UNITED STATES PATENT OFFICE.

ELY C. HUTCHINSON, OF OAKLAND, AND ELMER W. ANDERSON, OF SAN FRANCISCO, CALIFORNIA, ASSIGNORS TO PELTON WATER WHEEL COMPANY, OF SAN FRANCISCO, CALIFORNIA, A CORPORATION OF CALIFORNIA.

SPIRAL CASING.

1,380,065.   Specification of Letters Patent.   Patented May 31, 1921.

Application filed October 16, 1918. Serial No. 258,449.

*To all whom it may concern:*

Be it known that we, ELY C. HUTCHINSON and ELMER W. ANDERSON, citizens of the United States, residing the said Hutchinson at Oakland, in the county of Alameda and State of California, and the said Anderson at the city and county of San Francisco, State of California, have invented certain new and useful Improvements in Spiral Casings, of which the following is a specification.

Spiral casings for use in connection with hydraulic turbines, centrifugal pumps, air blowers, exhaust fans and the like have heretofore been constructed with the meeting edges of the adjacent casing-forming sections secured together by rivets or bolts passing through the material forming the same, one end of the securing members extending into the casing. Other constructions have been made wherein the meeting edges of the casing-forming members are overlapped, they being also secured together by bolts or rivets passing therethrough.

In both of these constructions, the portion of the bolts or rivets extending into the interior of the casing set up retarding forces for the fluid passing therethrough, and in so doing also set up eddy-currents in said fluid, thereby reducing the efficiency of the fluid passing therethrough. The adjacent edges of the sections so united are considerably weakened by the formation therein of the openings for the bolts or rivets, making said joints liable to open on the variation of internal or external pressure applied to the casing, and often requiring the calking of said joints.

The present invention has for its principal objects to provide a spiral casing, wherein all of the sheet metal construction thereof is integrally welded into a unit by means of oxy-acetylene, electric arc or other suitable welding process, the joint connections providing a fluid-tight casing capable of resisting at such joints pressure from within or without, and providing the strongest portion of the casing-forming metal at the joint unions thereof instead of weakening the same as in constructions heretofore contemplated.

In carrying out the present invention the longitudinal edges of adjacent sections are united by a weld joint which connects the substantial abutting surfaces thereof, the material forming the weld being either on the exterior or interior surface of the material, and when the same is on the interior surface is preferably polished or ground flush with said surface, overcoming the liability of interrupting or in any manner interfering with the fluid flow within said casing.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a top plan view of a sheet metal hydraulic turbine spiral casing.

Fig. 2 is a transverse vertical section taken on line A—A of Fig. 1.

Fig. 3 is a sectional view taken on line B—B of Fig. 1.

Figure 8:
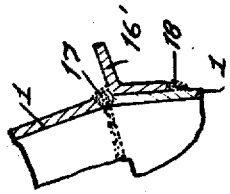
Figs. 8 and 9 illustrate methods of connecting the casing edges at a point where a reinforcing flange is employed.
Figure 10:
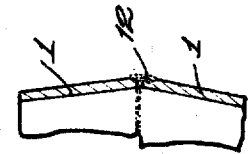
Fig. 10 illustrates a joint connection between adjacent edges of meeting sections.

Referring more particularly to the drawings, wherein like characters of reference designate corresponding parts, 1 indicates the sheet metal sections arranged in a series forming the casing, the horizontal edges of said sections being preferably arranged in abutting relation, as in the drawings. The successive sections 1, beginning at the inlet 2 of the casing, decrease in diameter, progressively reducing the cross sectional area of the chamber formed within the casing. The transverse edges or ends 3 of said sections 1 lie preferably adjacent the inner surface 4 of the spaced retaining or speed rings 5 of the usual construction which are spaced apart by the guide vanes 6 of any suitable construction. The inlet 2 leading into the spiral casing is formed through a circular sheet metal section 8 connecting at one edge with one of the sections 1, as in Fig. 1 of the drawings. The ends of sections 1, disposed adjacent the inner faces of the ring 5, are secured thereto by a weld joint 10 extending along the peripheral edge of the ring and a weld joint 11 extending along the ends of the sections thus securely uniting the sections to the rings by a permanent non-separable joint. The meeting edges of the majority of sections 1, preferably those taken on line a—a, Fig. 1, are permanently united by a weld 12 of the well known commercial form, while sections which are designed to be set up in the field or at the place of installation carry on their meeting edges suitable flange members 13 welded thereto as at 14, the flange members adapted to contact, and, as in Figs. 5 and 7, be bolted together, or, as in Fig. 6, to be secured together by a bolt passing through the flange and also by a weld 13' uniting the flange or angle members with the opposite sections and the edges of opposing sections together.

Figure 7:
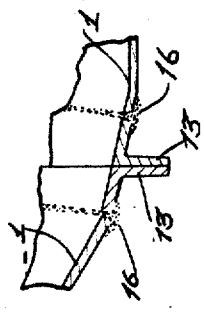
Figure 9:
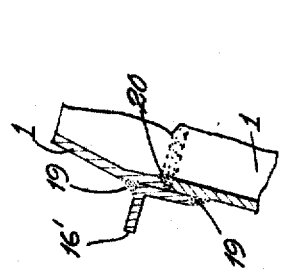
Figure 4:
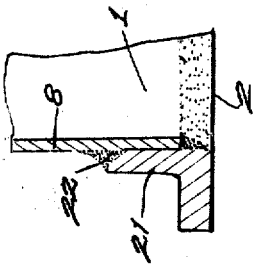
Fig. 4 is a view in section illustrating the method of welding the inlet flange to place.
Figure 5:
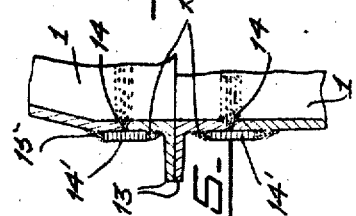

In the construction employed in Fig. 5 the weld joint 14 between the angles and the ends of the sections 1 is reinforced by a strap or band 14' positioned over the same and having its longitudinal edges welded as at 15, one to the casing member and the other to the angle member, or, as in Fig. 7, the angle members may be welded directly to the ends of the section as at 16 with the inner surface of the angle member lying flush with the inner surface of the adjacent members 1.

Where it is desirable to employ a reinforcing flange 16', as in sections c—d— Fig. 1 of the drawings, the same may be either formed as in Figs. 8 or 9; one less weld being required in Fig. 8, wherein the weld 17 uniting the abutting edges of the adjacent sections 1 also secures one edge of the angle to the section which it overlies, the other edge being secured by a suitable weld 18. In Fig. 9 the reinforcing angle member 16' overlies the meeting edges of the abutting sections, the same being secured at its opposite side edges to opposing sections by welds 19, and the abutting ends of said sections being secured together by a weld 20, three welds being employed in this construction.

The circular sheet metal section 8 has positioned over the end thereof, a suitable ring 21, the edges of the ring and section being united by welds 22, one extending circumferentially of the section 8 and the other being interiorly disposed circumferentially of the ring.

Figure 6:
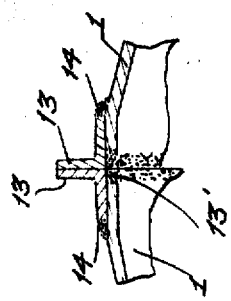
Figs. 5, 6 and 7 illustrate various methods of making bolted joint connections within a flange as employed for field bolting when casings are made in sections for putting together at the point of installation.

In assembling our present construction in the field or at the place of installation, we prefer to employ between the flanged ends of the sections to be assembled, the joint illustrated in Fig. 6, whereby the sheet metal sections as delivered to the place of installation in a partly assembled condition are permanently united together by a weld joint and are also united by a weld joint at their ends to the speed ring.

By our construction, a casing formed of sections fused or united into a unit structure is provided and wherein the joint unions between the sections and between the sections and speed ring are of such construction as to withstand the maximum strain placed on said casing, either from within or without, and which are also leakproof and are not required to be made watertight as are other constructions.

Having thus described our invention, what we claim as new and desire to protect by Letters Patent is:—

1. A joint construction comprising two parts, an edge of one part arranged opposing and close to an edge of the other part, a member arranged exteriorly of one of said parts with one edge disposed adjacent to the edge of said part, and having its opposite edges welded to said part, one of said welds uniting the edges of said adjacent parts, said lateral weld terminating flush with the faces of said adjacent parts providing a relatively smooth surface between the same.

2. A joint construction comprising two parts, an edge of one part arranged opposing and close to an edge of the other part, a member arranged exteriorly of one of said parts and having one edge and a portion of its under surface removed from said edge welded to said part by distinct welds, one of said welds uniting the edge of said adjacent parts and terminating flush with the inner faces of said adjacent parts providing a relatively smooth surface between the same.

In testimony whereof we have signed our names to this specification in the presence of two subscribing witnesses.

ELY C. HUTCHINSON.
ELMER W. ANDERSON.

Witnesses:
HARRY A. TOTTEN,
D. B. RICHARDS.